United States Patent [19]

Materna

[11] 4,373,513
[45] Feb. 15, 1983

[54] HIGH-EFFICIENCY NON-TRACKING SOLAR COLLECTOR DEVICE

[76] Inventor: Peter Materna, 943 Lanning Ave., Lawrenceville, N.Y. 08648

[21] Appl. No.: 160,552

[22] Filed: Jun. 17, 1980

[51] Int. Cl.³ ............................................. F24J 3/02
[52] U.S. Cl. ................................. 126/422; 126/435; 126/438; 126/432
[58] Field of Search ............... 126/438, 442, 444, 445, 126/449, 432, 417, 419, 422, 435; 252/73; 165/485, 175

[56] References Cited

U.S. PATENT DOCUMENTS

| | | | |
|---|---|---|---|
| 2,998,006 | 8/1961 | Johnston | 126/448 X |
| 3,203,167 | 8/1965 | Green, Jr. | 126/438 |
| 3,915,148 | 10/1975 | Fletcher et al. | 126/440 X |
| 3,994,279 | 11/1976 | Barak | 126/438 X |
| 4,121,564 | 10/1978 | Schwartz | 126/438 |
| 4,227,514 | 10/1980 | Spitzer | 126/900 X |
| 4,237,867 | 12/1980 | Bauer | 126/441 |
| 4,239,638 | 12/1980 | Beretta et al. | 126/900 X |

*Primary Examiner*—Larry Jones
*Attorney, Agent, or Firm*—Mark T. Basseches; Paula T. Basseches

[57] ABSTRACT

The present invention relates to a high efficiency non-tracking solar collector device of the type in which a reflector, lens or like concentrating apparatus concentrates received energy along a path, locus or band, the location of which varies within a range during the course of the solar collecting period of the day responsive to the inclination of the sun relative to the reflector. The device is characterized by the provision of a collector assembly which includes an energy absorptive receptor surface spaced from the reflector in accordance with the focal length thereof, the receptor surface defining a boundary of a plurality of parallel paths or conduits within which heat transfer fluid is caused to flow. The fluid paths have common input and output manifolds, the system being arranged, as a result of the fluid having a viscosity which is temperature sensitive and appropriate internal geometry of the flow paths, selectively to concentrate fluid flow through that path or paths receiving maximum radiant energy. By this means there is assured that the maximum flow will occur in the hottest zones of the collector assembly without requiring moving parts or mechanical control mechanisms, such as valves, solenoids or the like. Preferably, a porous flow inhibitor is incorporated in the flow paths, resulting in a substantial increase in the flow ratio between heated and unheated paths.

15 Claims, 5 Drawing Figures

HIGH-EFFICIENCY NON-TRACKING SOLAR COLLECTOR DEVICE

BACKGROUND OF THE INVENTION

1. Field of the Invention

The present invention relates to the art of solar collection devices and pertains more particularly to a high efficiency, non-tracking solar collector device of the type in which liquid is circulated in heat exchange relation across the receptor surface against which solar energy is concentrated by an appropriate non-tracking reflector, lens or other concentrating device (the term "reflector" as hereinafter used to be interpreted to encompass any concentrator device).

2. Prior Art

With the current shortage of fuels, there has been progressively increasing interest in the utilization of solar energy, which interest, in no small measure, has been increased by the progressive rise in prices of conventional fuels, including oil, natural gas, wood, coal and the like.

Devices which capture the sun's rays at their ordinary incident intensity are limited to a certain maximum temperature range, and so for purposes which require higher temperatures it is common to concentrate the sun's rays with a curved reflector, lens, or similar device.

Numerous methods have been suggested for efficiently employing the concentrated rays of the sun as a source of heat. Obviously, it is desirable for a given area of reflector or concentrator surface that the maximum possible energy be extracted.

In accordance with a known type of solar collector, known as a tracking collector, a heat carrier liquid is circulated through a passage and the collected concentrated sun's rays are impinged against an external surface of the passage. The reflector or other concentrating device is provided with means for compensating for the varying angle of the sun whereby, notwithstanding variations in the sun's inclination, the collected rays are focused more or less precisely on the heat transfer surface of the passageway.

Numerous types of tracking mechanisms are employed for optimizing the azimuth angle of the concentrator or collector surface, including clock mechanisms, photo-electric guide systems and the like which orient the position of the concentrator relative to the collector. Such systems, while effective, are extremely expensive and are failure-prone, especially where conditions such as snow, high winds and ice are encountered, and require maintenance throughout the operating life of the installation.

In order to avoid the expense and difficulties inhering in tracking type solar collector devices, resort has been made to solar collectors operating on a non-tracking basis. Such devices incorporate a fixed (seasonally adjusted) reflector, normally elongate and oriented in an east-west direction, the reflector being curved so as to concentrate most of the incident rays along a linear path, the location of which varies in accordance with the inclination of the sun. A receptor member is disposed to receive the concentrated band of energy emanating from the reflector.

In certain such systems plural targets are present and means are provided for maximizing flow through that portion or those portions of the target or paths which are hottest.

The means heretofore employed for maximizing fluid flow through the path area in registry with concentrated energy have included heat sensors and solenoids (U.S. Pat. Nos. 3,915,148 Fletcher; 3,994,279 Barak; 4,121,566 Radenkovic; 4,153,955 Hinterberger); thermally activated valves (U.S. Pat. No. 4,103,673 Woodworth); change of state responsive energy extraction mechanisms (U.S. Pat. No. 4,052,976 Hinterberger) and variations and combinations of the above.

SUMMARY OF THE INVENTION

The present invention relates to a high efficiency solar collector of the non-tracking type characterized in that there are provided a plurality of parallel flow paths for the heat exchange liquid, which flow paths are positioned in the anticipated locus of concentrated energy gathered by the reflector. The fluid is caused to flow preferentially through that path or those paths which are in closest registry with the collected energy and, hence, hottest, by a system dependent upon the fact that the fluids in the hottest paths will have a lower viscosity than the fluids in the cooler paths, whereby, although the flow of fluid in the cooler paths is not totally prevented, the proportion of fluid flow will be greatest through the hottest paths.

More particularly, the viscosity preferential collector apparatus may include as the heat transfer substance a liquid which undergoes substantial viscosity changes within the range of temperatures normally anticipated in a given system type, i.e. substantially lower in viscosity at the temperature of the hottest path than at the temperature of the other paths. Preferably, the viscosity selective collector assembly may comprise a series of parallel and abutting flow passages having as a boundary of the passages a receptor surface positioned to receive the concentrated energy focused by the reflector. A common input and output manifold feeding all of the passages is connected into the heat exchange circuit, the manifold providing equal flow resistance to the fluid in each path.

In its simplest form, the device is charged with a heat exchange fluid which will evidence substantial changes in viscosity from passage to passage, depending on the temperature thereof, and the system geometry and operating parameters are arranged such that the governing pressure drops controlling the relative flow among the various flow channels are viscosity-dependent, and in particular the governing pressure drop is produced by laminar flow along the length of the main body of the channels.

Such simplest form of device is likely to be of significant efficiency only where the temperature differential in the various paths is sufficient to induce large viscosity variations in the selected liquid.

In accordance with a preferred embodiment which substantially increases the efficiency of the system, the passages may include, preferably adjacent the terminal ends thereof, a fluid flow impeding porous substance, such as an open celled sponge, a fibrous mass, a plurality of granules, a honeycomb-like lattice, etc. such that the flow through the flow inhibiting element is substantially dependent on the viscosity of the liquid. The incorporation of such flow inhibiting elements results in a more pronounced flow differential among the various paths than would be realized without such elements, and provides a high degree of path selectivity even where there are small viscosity variations from path to path.

By an appropriate selection of liquid and flow impeding material, flow ratios between the heated and the unheated channels of 10:1 or more may be achieved, with resultant high efficiency of the solar collector system as a whole.

As a further means of increasing the flow differential, resort may be made to fluids of the non-Newtonian type which are shear thinning as well as heat thinning, whereby viscosity decrease of the fluid resulting from temperature differentials is accompanied by a synergistic viscosity loss due to the shear thinning property of the fluid.

Accordingly, it is an object of the invention to provide a highly efficient non-tracking solar collector device.

A further object of the invention is the provision of a solar collector device of the type described wherein liquid is enabled to flow along parallel paths with preferential flow being induced in the hottest path or paths as a result of viscosity differential of the liquid in the respective paths.

A further object of the invention is the provision of a device of the type described which includes a reflector, lens or the like adapted to concentrate incident light along a locus which is variable transversely in accordance with the angle of incidence of the light, in combination with a collector assembly positioned to receive the concentrated or band of light from the reflector. The surface of the collector assembly defines a boundary of a multiplicity of side-by-side liquid conductor paths, the flow being maximized in a given path or paths which are hottest as a result of the temperature induced viscosity differential between such path or paths and other less heated paths.

Still a further object of the invention is the provision of a device of the type described which includes flow inhibiting means, such as a porous mass, located preferably at the terminal end of the flow paths, which porous mass materially increases the difference in the flow rates in the various paths for a given available viscosity difference among the various paths.

Still a further object of the invention is the provision of a device of the type described which uses a shear-thinning non-Newtonian fluid, in which the flow is maximized in a given path or paths which are hottest, as a result of the temperature induced viscosity variation accompanied by a shear-dependent viscosity variation resulting from the temperature-induced variation in flow rates.

To attain these objects and such further objects as may appear herein or be hereinafter pointed out, reference is made to the accompanying drawings forming a part hereof, in which.

Figure 1:
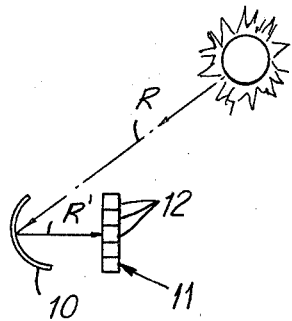
FIG. 1 is a diagrammatic view of a fixed or non-tracking solar collector device.

Referring now to the drawings, there is diagrammatically illustrated in FIG. 1 a non-tracking solar collector apparatus including a collecting reflector or lens 10 and a heat extracting collector assembly 11 which illustratively comprises a series of parallel, longitudinally extended channels 12. The concentrated or focused rays R' will impinge selectively against one or more of the adjacent channels 12, with the result that certain of the said channels receive substantially more radiant energy than others and are substantially hotter than others. In the course of a day, the incident angle of the sun's rays on the fixed concentrator 10 will, of course, vary, with the result that the location of the hottest channel(s) will vary in the course of a day.

For maximum efficiency in extracting the collected energy, it is desirable that a maximum of fluid flow be effected through that channel or those channels which are at their highest temperature and that a minimal flow occur in the channels which are at lower temperatures.

Figure 2:
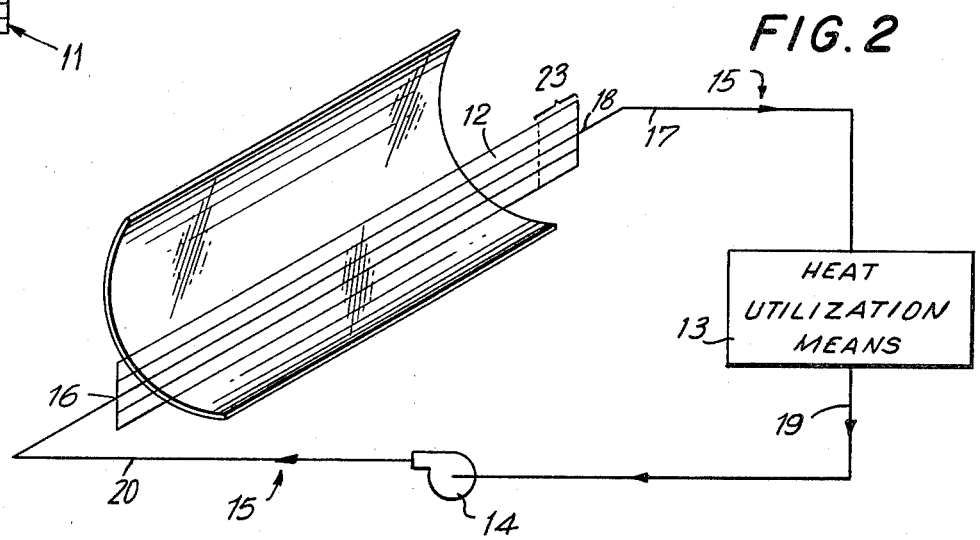
FIG. 2 is a diagrammatic view of a solar collector system in accordance with the invention.
Figure 3:
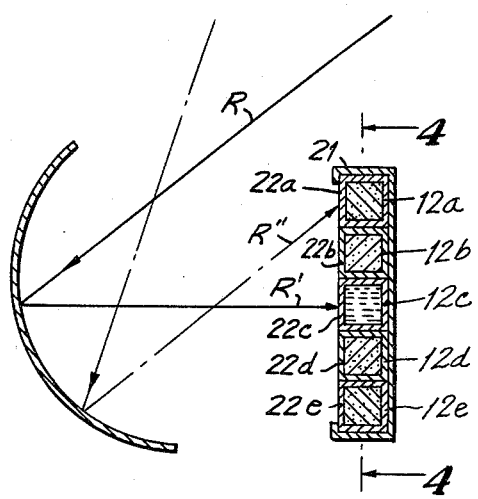
FIG. 3 is a vertical sectional view, diagrammatic in nature, of a collector assembly in accordance with the invention.
Figure 4:
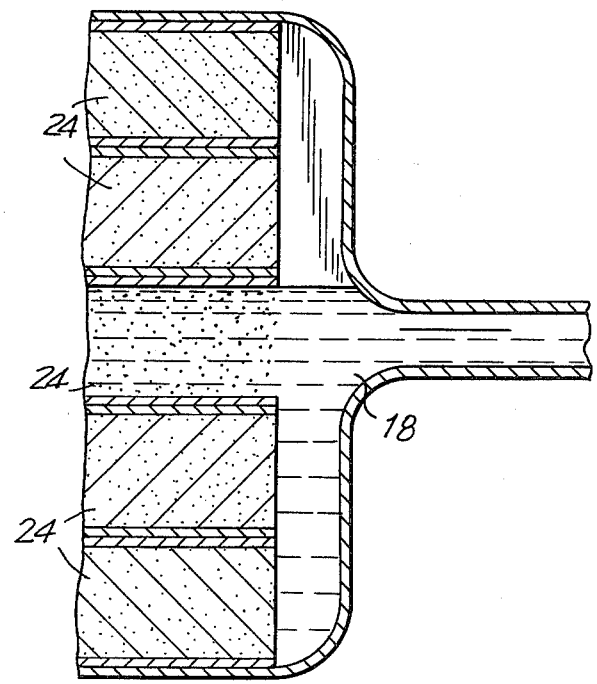
FIG. 4 is a magnified fragmentary sectional view taken on the line 4—4 of FIG. 3.

As will be appreciated from FIG. 2, which schematically illustrates a complete collector device in combination with heat utilization means 13 and circulating pump 14, the apparatus, during a collecting cycle, i.e. during the period when the sum effectively transmits significant heat energy to one or more of the channels 12, functions by inducing through the medium of the pump 14 a circulation in the direction of the arrows 15 (FIG. 2) from the pump 14 through inlet manifold 16 along one or more of the channels 12 and to conduit 17 connected to output manifold 18. The heated liquid in conduit 17 is passed through the heat utilization means 13, the fluid emanating from the utilization means flowing via conduit 19 back to the pump 14 and thence again through 20 to the input manifold 16.

The present invention is directed primarily to a means for effectively and reliably assuring that most of the liquid will be passed through that one or those ones of the conduits 12 which are in the path of the rays R' and thus are heated to the highest temperature.

While the invention has been illustrated utilizing the viscosity selective principle as the sole means for preferential selection of channels, it will be readily recognized by those skilled in the art that even greater efficiency may be developed by employing a combination of path selecting mechanisms in conjunction with the preferential viscosity method.

As previously noted, mechanical and electrical heat sensing devices employing valves in the respective paths may be used in combination with the viscosity selective principles hereinafter set forth, and it will be found that the efficiency of such alternative flow selecting mechanisms will be augmented when used in conjunction with a viscosity preferential system. For example, requirements for tracking accuracy in a tracking system may be eased using the viscosity preferential method.

I have discovered that a preferential flow through a selected one or more of the paths 12 may be achieved by utilizing as the heat distributing medium in the system a liquid whose viscosity decreases significantly with temperature within the projected temperatures of operation of the system, and by arranging the system geometry and operating parameters such that the pressure drops controlling the relative flow among the various channels are viscosity-dependent, as in the case of laminar flow especially. If the flow consists of fully developed laminar flow through uniform tubes, then the pressure drop is given by the Hagen-Poiseuille formula $$\Delta p = \frac{32\mu \bar{u} L}{D^2 g_c}$$

where
Δp = pressure drop
ū = average flow velocity
L = length of the tube
μ = viscosity of the fluid
D = diameter of the tube
$g_c$ = conversion factor, 32.2 lbm-ft/sec²lbf For the present case, in which the viscosity varies over the length of the tube, this formula must be generalized to $$\Delta p = \frac{32\bar{u}}{D^2 g_c} \int_p^l \mu(x) dx$$

I have further discovered that the viscosity preferential effects are greatly augmented if at least a short portion of the conduits 12, preferably adjacent the terminal end, include therein a porous flow-inhibiting material or similar element which provides a relatively large viscosity-dependent pressure drop at that one location. For a porous medium flow is generally governed by the Kozeny-Carman equation given here. This equation is applicable to flow through a porous medium if the Reynolds number based on the average pore size is small (i.e. in the laminar range), which is the case in the present situation (i.e. Re ≲2000).

$$\Delta p = \bar{u} L \frac{(1 - \epsilon)^2}{\epsilon^3} \mu k \left( \frac{S}{V_s} \right)^2$$

where
Δp = pressure drop
u = average flow velocity outside the porous element
L = length of the porous element
μ = viscosity of the fluid
ε = void fraction, i.e., volume of voids/total volume
k = Kozeny's function, commonly k ≈ 5.0
S = total surface area of particles
$V_s$ = total volume of solid particles Here, μ is the viscosity of the fluid at the location of the porous element, which is typically at the end of the channel.

In this case (flow rate related to μ at the exit), the flow rates in the various channels will be more sensitive to temperature differences among the various channels than would be the case when the system is constructed without the flow inhibiting element (flow rate related to $$\int_o^l \mu(x) dx),$$

It is to be noted that in the flow situations described by the above two formulas, the pressure drop is directly related to the viscosity of the fluid. However, other flow situations are possible in which the dependence of pressure drop on viscosity is not nearly so strong. These situations include turbulent flow (high Reynolds number), and flow through orifices and other geometries with sharp edges and sharp or sudden changes of geometry. For the present invention, the system must be designed such that these other flow situations do not produce the controlling pressure drop in the individual flow channels.

Without limitations and in compliance with the requirements of the Patent laws, I will hereinbelow describe in detail a particular installation and describe the general parameters as calculated to be achieved during normal operation.

In accordance with a specific embodiment, there is provided a concentrating device, i.e. the reflector member or lens 10, which may be approximately 20' in length and oriented in an east-west direction at an inclination which, in accordance with the season of the year, maximizes concentration of the reflected rays R' and R'' on the side-by-side collector channels 12 during those hours of the day when the sun is hottest.

For purposes of example, there is assigned a typical condition wherein, if the flow of heat removal fluid is small or zero, then the most-heated channel will reach a limiting temperature of 460° F. (238° C.), while the four lesser-heated channels will reach a limiting temperature of 140° F. (60° C.).

Illustratively, the collector channels may comprise square conductive metallic tubes 12a, 12b, 12c, 12d and 12e, it being readily recognized that the number and cross-sectional area of the tubes are by no means critical.

The tubes 12a to 12e may be maintained in a parallel abutting relation by an enclosure member 21 which embraces the tubes but leaves the front or receptor surfaces 22a to 22e exposed for the direct impingement thereon of the focused rays. The front surfaces may include a pigmented (or like spectrally selective) coating to render the same high in absorption but low in re-radiation, for maximum efficiency. Thermal insulation means may be provided between the tubes to reduce conduction of heat sideways between adjacent tubes at unequal temperatures, thereby improving the efficiency of the system.

The tubes 12a through 12e may be approximately 22' in length, projecting slightly beyond the effective concentrating area of the 20' reflector 10.

By way of illustration, the cross-sectional area of each of the conduits 12 may be approximately ¼ square inch, more of less. Likewise, while the conduits have been illustrated as square in section, they may comprise circular copper tubes or other geometries.

The efficiency of the apparatus is greatly increased by the inclusion, preferably at the terminal area 23 of the conduits, of a viscosity dependent flow inhibitor means 24. By way of example, satisfactory such inhibitor means may comprise a 6" length of a porous medium comprising spheres, such as glass beads or the like of 0.06" diameter packed with a porosity (void fraction) of approximately 50%. Alternative inhibitor means such as a sand material, open cell plastic sponge material, steel wool of a corrosion resistant nature, a porous metallic structure achieved through the use of powder metallurgy, porous ceramic, a honeycomb-like lattice, etc., may be readily substituted.

As will be more fully understood from the ensuing discussion, the size of the voids and, in some instances, the longitudinal extent of the conduits occupied by the flow inhibitor means should be made dependent upon the operating parameters of the device, including particularly the range of viscosity of the liquids employed, the anticipated temperature range, and the pressure head under which the system will be run.

As a rule of thumb, I have determined that where a flow inhibitor means is employed, the pressure drop across the flow inhibitor means should be substantially larger than the pressure drop across the overall length of the channel and, thus, the length of the channel is a further factor to be considered.

Figure 5:
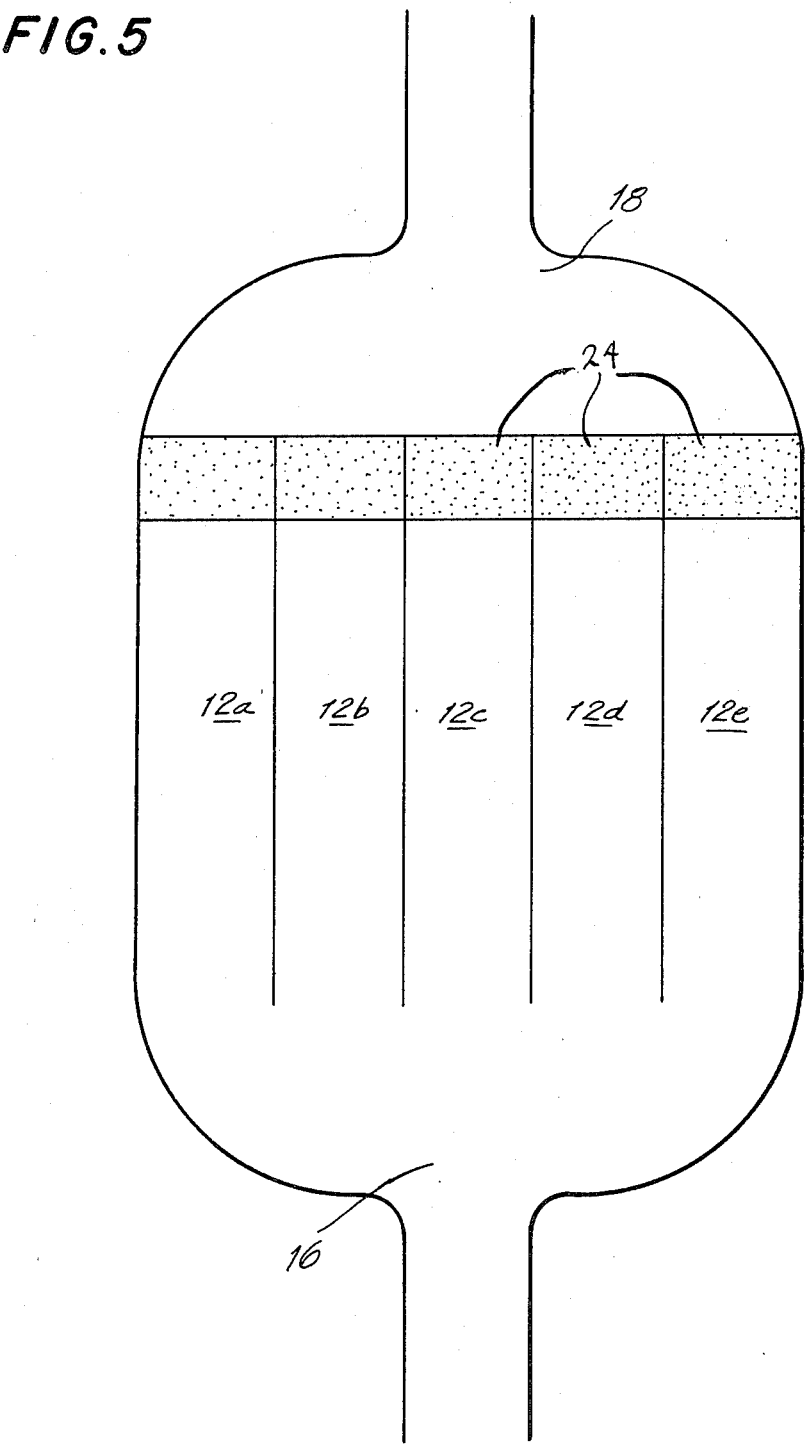
FIG. 5 is a schematic diagrammatic view of the collector assembly component of the collector device illustrating the flow ratio within adjacent flow paths.

Referring now particularly to FIG. 5, comparisons will be made with reference to different operating temperatures and heat carrier fluids.

EXAMPLE I

A system as described, e.g. 20' effective heat collector conduit length and utilizing ethylene glycol (viscosity at 60° F. (15.6° C.) approximately 31 centipoise; viscosity at 140° F. (60° C.) approximately 5.2 centipoise; viscosity at 340° F. (171.1° C.) approximately 1 centipoise, as the collector fluid under a pressure level of approximately atmospheric and assuming further that one channel is heated to 340° F. (171.1° C.) whereas the other channels 12, being clear of the direct impingement of the ray R', are heated to approximately 140° F. (60° C.), and further assuming an inlet temperature of 60° F. (15.6° C.) and using as the viscosity sensitive flow inhibiting means a 6" length of spheres, as previously described, it will be observed that the flow rate in each of the unheated channels relative to the flow rate in the heated channel is 0.175:1.

For the illustrated example, the mixed average temperature of the fluid emerging from the manifold 18 will be approximately 242° F. (117° C.).

By way of comparison, if the viscosity selectivity principle were used without the flow inhibitor element, for the same total flow rate through the collector, the ratio of the flow rate in each of the unheated channels relative to the flow rate in the heated channels would be 0.36:1. The exit temperatures in the heated channels and the unheated channels would be, respectively, 361° F. (183° C.), and 138° F. (59° C.). The mixed average temperature of the fluid would be 230° F. (110° C.).

As a control, given the same system utilizing a similar liquid whose viscosity is not significantly temperature sensitive in the temperature range noted, or given a similar system which does not exploit viscosity selectivity, the average (mixed) exit temperature of the fluid is approximately 199° F. (92.8° C.), indicating a temperature improvement of approximately 43° F. (24° C.) derived from the utilization of a viscosity sensitive liquid and flow inhibitor means.

The results achieved utilizing SAE 10-W oil are extremely close to those obtained utilizing the ethylene glycol.

It will next be observed that where higher temperatures are employed, even greater increases in efficiency may be derived.

EXAMPLE II

As an example of such high temperature utilization, the selected fluid was Dowtherm-G, a product of Dow Chemical Co., being an aromatic hydrocarbon with an atmospheric boiling point of 575° F. (302° C.), viscosity at 60° F. (15.6° C.) being approximately 50 centipoise, viscosity at 140° F. (60° C.) being approximately 6.9 centipoise, viscosity at 427° F. (219° C.) being approximately 0.57 centipoise. DOWTHERM is a mixture of diphenyl oxide and biphenylyl-phenyl-ether.

The exit temperatures were approximately 140° F. (60° C.) for all tubes except the one directly receiving ray R', which was heated to approximately 427° F. (219° C.). It should be noted that the temperatures given are assumed to occur during the functional cycle of the apparatus and would vary in accordance with the rate of flow.

In Example II and utilizing the apparatus of Example I, maintaining a pressure level of approximately atmospheric, the flow ratio calculated was 12 times greater in the heated conduit than in the conduits heated to 140° F. (60° C.).

The mixed average temperature of the emerging fluid was 356° F. (180° C.).

For the case where viscosity selectivity is used without the flow inhibitor element, the flow ratio is 4.2:1 and the mixed average temperature of the emerging fluid is 297° F. (147° C.).

In the case of a control wherein uniform mixed flow was effected, the exit temperature was approximately 204° F. (96° C.), showing that the use of the flow inhibitor element produces a gain of approximately 152° F. (84° C.) over the case where no viscosity selectivity is used at all. Thus, for the same overall flow rate, more than twice as much heat is collected when the flow inhibitor element is used.

EXAMPLE III

In this instance, the liquid utilized comprised water and the flow rate was adjusted such that a relatively low temperature differential existed between the flow in the directly heated conduit and those not directly heated. More specifically, the ratio of flow of unheated to heated was approximately 0.46:1.

In this instance, with an inlet temperature of 60° F. (15.6° C.), the mixed average temperature of the emerging fluid was 145° F. (62.8° C.).

In the control situation (eliminating the viscosity sensitive flow inhibiting means) an exit temperature mix of 141° F. (60.6° C.) was calculated.

The gain of 4° F. (2.2° C.) in the instance of Example III would probably not justify the viscosity sensitive installation.

As will be appreciated from this disclosure, numerous variations may be made by those skilled in the art without departing from the spirit of the present invention.

Specifically, it will be recognized that maximum efficiency is likely to be derived where the selected liquid undergoes a substantial viscosity change within the range of temperatures which the liquid will achieve.

Similarly, the flow ratio is affected by such factors as pressure, heat, lens or reflector structure, characteristics of flow inhibitor and the like.

While it is preferred in almost all cases to employ a viscosity sensitive flow inhibiting element in the various flow passages, it will be understood that such means may be dispensed with, particularly where, as noted, the selected liquid undergoes drastic viscosity changes within the operating temperature range, and where also the requirement of laminar or viscosity-dependent flow within the main body of the channels themselves is satisfied.

It will be observed that, in accordance with the invention, substantial increases in operating efficiency may be achieved without resort to moving parts, such as mechanical or electrical control apparatuses, which are expensive and have a high liability to failure in use, and require maintenance.

It will be recognized that the use of higher viscosity collector liquids and/or flow inhibitor elements may require the input of slight additional amounts of energy, due to the increased pump power required. However, such slight additional energy inputs are more than compensated for by the increase in efficiency resulting from use of the system.

Having thus described the invention and illustrated its use, what I claim as new and desire to secure by Letters Patent is:

1. A radiant energy receiver operable between minimum and maximum operating temperatures, comprising:
   a plurality of fluid conductors of predetermined crossectional area, thermally isolated from each other and presenting parallel paths to a common flow input;
   a fluid disposed in said plurality of fluid conductors having a negative thermal coefficient of viscosity such that the viscosity of said fluid changes at least by a factor of 5 in response to said fluid being heated and cooled between the minimum and maximum operating temperatures of said receiver, said fluid having minimum and maximum viscosities at the maximum and minimum operating temperatures of said receiver, respectively;
   successive ones of said plurality of fluid conductors receiving radiant energy with others of said plurality of fluid conductors remaining unenergized, depending upon the time of day and time of year;
   energy utilization means in thermal communication with said fluid;
   means for circulating said fluid through said ones of said fluid conductors and said energy utilization means;
   said fluid acting as a valving means responding to said fluid being heated and cooled to permit the flow of said fluid through said successive ones of said plurality of fluid conductors receiving radiant energy, and to stop the flow of said fluid through said others of said plurality of fluid conductors remaining unenergized.

2. A high efficiency non-tracking solar collector device comprising an elongate concentrator means configured to concentrate incident light along a band extending parallel to the axis of said reflector, the transverse position of said band varying as a function of the incident angle of light on said reflector, a collector assembly having a receptor surface spaced from said reflector in accordance with the focal length of said reflector, said surface having a longitudinal extent substantially coincident with the lenth of said band and a lateral extent substantially coincident with the extreme positions assumed by said band responsive to the impingement of useful incident light on said collector, characterized in that said collector assembly defines a liquid container bounded by and in heat conductive relation to said receptive surface, said container being divided into a plurality of side-by-side abutting flow passages extending parallel to the axis of said reflector, an entrance and an exit manifold formed on said container, each said manifold communicating with all said passages, pump means for circulating liquid from said entrance to said exit manifold through said passages and a liquid in said system subject to viscosity changes in the range of temperatures encountered in said collector assembly whereby the viscosity of fluid in the respective passages is a function of the temperature of the liquid therein and, accordingly, the flow rate is maximized through the hottest said passages.

3. Apparatus in accordance with claim 2 and including a viscosity sensitive flow inhibitor member in each said passage.

4. Apparatus in accordance with claim 3 wherein the pressure drop across each said flow inhibitor member is at least equal to the pressure drop across the entirety of a said passage.

5. Apparatus in accordance with claim 3 wherein said flow inhibitor members comprise a honeycome-like lattice or set of tubes or passageways substantially narrower than the main body of the channel.

6. Apparatus in accordance with claim 3 wherein said flow inhibitor members comprise a fibrous material.

7. Apparatus in accordance with claim 3 wherein said flow inhibitor members comprise a porous material.

8. Apparatus in accordance with claim 7 wherein said porous material comprises a polymeric sponge.

9. Apparatus in accordance with claim 7 wherein said porous material comprises a plurality of discrete particles having interstices therebetween.

10. Apparatus in accordance with claim 9 wherein said particles are bonded together.

11. Apparatus in accordance with claim 10 wherein said porous material comprises a ceramic.

12. Apparatus in accordance with claim 10 wherein said porous material comprises a sintered metal.

13. Apparatus in accordance with claim 2 wherein said liquid is also shear thinning.

14. A high efficiency non-tracking solar collector device comprising an elongate concentrator means configured to concentrate incident light along a band extending parallel to the axis of said reflector, the transverse position of said and varying as a function of the incident angle of light on said reflector, a collector assembly having a receptor surface spaced from said reflector in accordance with the focal length of said reflector, said surface having a longitudinal extent substantially coincident with the length of said band and a lateral extent substantially coincident with the extreme positions assumed by said band responsive to the impingement of useful incident light on said collector, characterized in that said collector assembly defines a liquid container bounded by and in heat conductive relation to said receptive surface, said container being divided into a plurality of side-by-side abutting flow passages extending parallel to the axis of said reflector, an entrance and an exit manifold formed on said container, each said manifold communicating with all said passages, pump means for circulating liquid from said entrance to said exit manifold through said passages and a liquid in said system subject to viscosity changes in the range of temperatures encountered in said collector assembly, said viscosity varying at the extremes of said temperature range within a ratio of from at least about 1.5:1 to 50:1 whereby the viscosity of fluid in the respective passages is a function of the temperature of the liquid therein and, accordingly, the flow rate is maximized through the hottest said passages.

15. Apparatus in accordance with claim 14 wherein the ratio of flow of liquid from hottest to coolest passages is at least about 1.5:1 to 15:1.

* * * * *